(12) United States Patent
Matsuo et al.

(10) Patent No.: US 11,443,532 B2
(45) Date of Patent: Sep. 13, 2022

(54) CAPTURING NEUTRAL FACE EXPRESSION APPARATUS AND METHOD

(71) Applicant: HONDA MOTOR CO., LTD., Tokyo (JP)

(72) Inventors: Yoshikazu Matsuo, Saitama (JP); Hisumi Esaki, Saitama (JP); Takashi Okada, Saitama (JP); Hiromi Sato, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 255 days.

(21) Appl. No.: 16/724,357

(22) Filed: Dec. 22, 2019

(65) Prior Publication Data

US 2020/0210735 A1 Jul. 2, 2020

(30) Foreign Application Priority Data

Dec. 28, 2018 (JP) ............................. JP2018-246829

(51) Int. Cl.
| | |
|---|---|
| *G06V 20/59* | (2022.01) |
| *G06V 20/58* | (2022.01) |
| *G06T 7/73* | (2017.01) |
| *B62D 15/02* | (2006.01) |
| *B60W 40/09* | (2012.01) |
| *G06V 40/16* | (2022.01) |

(52) U.S. Cl.
CPC ........... *G06V 20/597* (2022.01); *B60W 40/09* (2013.01); *B62D 15/021* (2013.01); *G06T 7/74* (2017.01); *G06V 20/58* (2022.01); *G06V 40/175* (2022.01)

(58) Field of Classification Search
CPC ........... G06K 9/00845; G06K 9/00308; G06K 9/00805; G06K 9/00255; G06K 9/00302; G06K 9/00832; B60W 40/09; B62D 15/021; G06T 7/74
See application file for complete search history.

(56) References Cited

U.S. PATENT DOCUMENTS

| | | | |
|---|---|---|---|
| 10,558,740 B1* | 2/2020 | O'Malley | ............. G06F 40/197 |
| 2010/0322507 A1* | 12/2010 | Gunaratne | ......... G06V 10/7557 |
| | | | 382/209 |
| 2016/0075377 A1* | 3/2016 | Tomozawa | ................ B60R 1/00 |
| | | | 701/41 |
| 2017/0106858 A1* | 4/2017 | Li | .......................... B60W 10/18 |
| 2018/0025240 A1* | 1/2018 | Klement | ............... H04N 13/239 |
| | | | 348/47 |
| 2018/0050696 A1* | 2/2018 | Misu | ..................... A61B 5/7282 |
| 2018/0134116 A1* | 5/2018 | Chen | .................. B60H 1/00764 |
| 2018/0170375 A1* | 6/2018 | Jang | ....................... B60K 28/06 |
| 2018/0178807 A1* | 6/2018 | Murata | ................... G01C 21/34 |
| 2018/0189581 A1* | 7/2018 | Turcot | ............... G01C 21/3415 |

(Continued)

FOREIGN PATENT DOCUMENTS

| | | |
|---|---|---|
| JP | 2016076259 A | 5/2016 |
| JP | 2018106530 A | 7/2018 |

*Primary Examiner* — Ming Y Hon (57) ABSTRACT

An information processing apparatus comprising a situation acquiring unit configured to acquire a situation of one movable object, and a storing execution unit configured to store a face image of an occupant on the one movable object, captured by an image-capturing unit mounted on the one movable object when the one movable object is in a predetermined situation, as a face image of the occupant with neutral facial expression is provided.

12 Claims, 9 Drawing Sheets

(56) References Cited

U.S. PATENT DOCUMENTS

| | | | | |
|---|---|---|---|---|
| 2018/0215392 A1* | 8/2018 | Kosaka | ............... | G05D 1/0061 |
| 2018/0300534 A1* | 10/2018 | Elor | .................. | G06K 9/00228 |
| 2018/0330152 A1* | 11/2018 | Mittelstaedt | ....... | G06K 9/00261 |
| 2018/0362053 A1* | 12/2018 | Isa | ..................... | G02B 27/0093 |
| 2019/0139233 A1* | 5/2019 | Das | ....................... | B60K 28/06 |
| 2019/0163997 A1* | 5/2019 | Matsumura | ........ | G06K 9/00926 |
| 2020/0170576 A1* | 6/2020 | Lerner | .................. | G07C 5/008 |

\* cited by examiner

CAPTURING NEUTRAL FACE EXPRESSION APPARATUS AND METHOD

The contents of the following Japanese patent application are incorporated herein by reference: 2018-246829 filed in JP on Dec. 28, 2018

BACKGROUND

1. Technical Field

The present invention relates to an information processing apparatus and a computer-readable storage medium.

2. Related Art

Apparatus for executing emotion estimation processing to estimate an emotion of a vehicle occupant based on a face image of the occupant, has been known (for example, refer to Patent document 1). Also, a technique for estimating the emotion of a person using a face image with neutral facial expression of a person has been known (for example, refer to Patent document 2).

PRIOR ART DOCUMENTS

Patent Documents

[Patent document 1] Japanese Patent Application, Publication No. 2018-106530
[Patent document 2] Japanese Patent Application, Publication No. 2016-076259

SUMMARY

It is desirable to provide a technique to enable efficient acquisition of a face image of a vehicle occupant with neutral facial expression.

DESCRIPTION OF EXEMPLARY EMBODIMENTS

Hereinafter, the present invention will be described with reference to embodiments of the invention. However, the following embodiments should not to be construed as limiting the claimed invention. Also, all the combinations of the features described in the embodiments are not necessarily essential for means provided by aspects of the invention.

Figure 1:
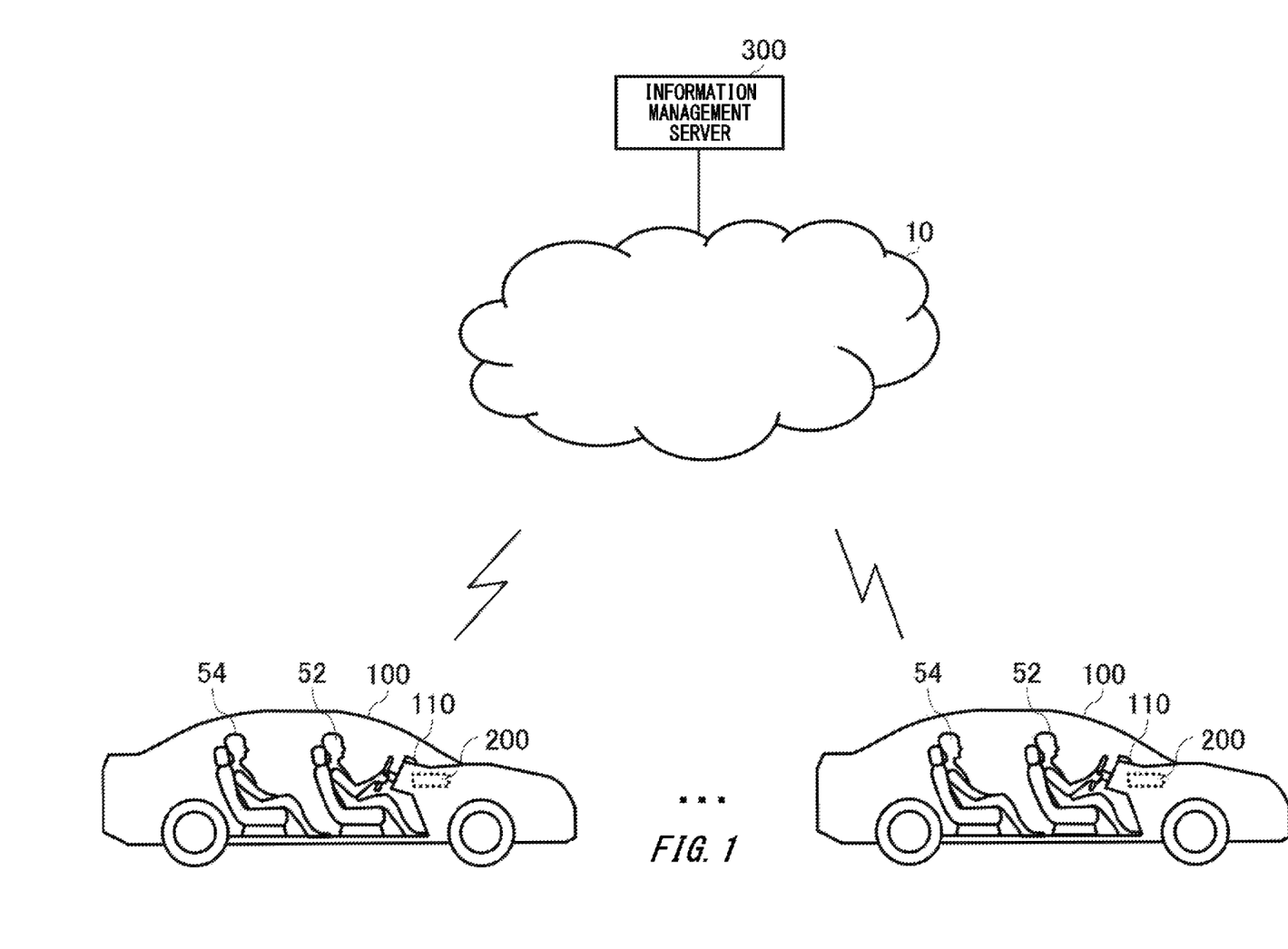
FIG. 1 schematically shows an example of a vehicle 100 according to the present embodiment.

FIG. 1 schematically shows an example of a vehicle 100 according to the present embodiment. The vehicle 100 may be an example of a movable object moving with an occupant thereon. The vehicle 100 may include the information processing apparatus 200. The information processing apparatus 200 may have an emotion estimation processing function to estimate an emotion of the vehicle 100 occupant.

In the present embodiment, if persons onboard the vehicle 100 are not distinguished, the persons are described as occupants, and if a person who is driving and a person who is not driving are not distinguished, the former is described as a driver 52 and the latter is described as a passenger 54. If the vehicle 100 is an automated drive vehicle, the driver 52 may be a person sitting on a driver's seat. The passenger 54 may be a person sitting on a front passenger seat. The passenger 54 may be a person sitting on a backseat.

The information processing apparatus 200 may be capable of performing emotion estimation processing for estimating an emotion of the occupant using an image of the occupant. The information processing apparatus 200 acquires the occupant's image captured by an image-capturing unit included in the vehicle 100. The image-capturing unit may have one camera 110 capable of capturing images of the entire cabin of the vehicle 100. The information processing apparatus 200 may acquire an image of the driver 52 and an image of the passenger 54 from the camera 110.

The image-capturing unit may have a plurality of cameras 110. The information processing apparatus 200 may acquire the image of the driver 52 and the image of the passenger 54, that are captured by respective ones of the plurality of cameras 110, from the plurality of cameras 110. For example, the image-capturing unit has a camera 110 capable of capturing images of the driver's seat and front passenger seat and a camera 110 capable of capturing images of the backseat. The image-capturing unit may have a camera 110 capable of capturing images of the driver's seat and a camera 110 capable of capturing images of the front passenger seat. The image-capturing unit may have a plurality of cameras 110 capable of capturing images of respective ones of a plurality of passengers 54 in the backseat.

For example, the information processing apparatus 200 stores the occupant's face image with neutral facial expression. The neutral facial expression may be a facial expression so-called plain facial expression. For example, the occupant's plain facial expression is a facial expression when the occupant is aware of nothing. The information processing apparatus 200 may estimate an emotion of the occupant by comparing the occupant's face image captured by the camera 110 and the face image with neutral facial expression.

For example, the information processing apparatus 200, pre-stores an association data in which the difference from the neutral facial expression and the patterns of human emotion are associated with each other. For example, in the association data, a facial expression with mouth corners lifted relative to the neutral facial expression is associated with a positive emotion, and a facial expression with mouth corners lowered relative to the neutral facial expression is associated with a negative emotion. The association data may further associate the degree of the difference from the neutral facial expression and the degree of the emotion. For example, the association data associates a facial expression with more lifted mouth corners relative to the neutral facial expression with a higher degree. The information processing apparatus 200 gives an estimation result of the emotion of the occupant by specifying any one of the emotion patterns and the degree of emotion using the occupant's image captured by the camera 110, the face image with neutral facial expression and the association data.

As for the patterns of human emotion, for example, the patterns of human emotion based on Russell circumplex model, which expresses human emotions by two axes of arousal and valence and expresses the degree of emotion by the distance from the origin, may be adopted. Also, for example, the emotion patterns based on Plutchik emotion wheel, in which human emotions are classified into eight basic emotions (joy, trust, fear, surprise, sadness, disgust, anger and anticipation) and applied emotions obtained by combining two adjacent emotions, may be adopted. The information processing apparatus 200 according to the present embodiment may adopt any emotion patterns without being limited to these.

For example, the occupant's face image with neutral facial expression can be acquired by initial configuration. For example, the information processing apparatus 200 prompts the occupant to express a neutral facial expression when the occupant gets on the vehicle 100, and stores the occupant's face image captured by the camera 110 as the occupant's face image with neutral facial expression. However, in this case, the occupant is forced to set the initial configuration and the occupant may feel annoyed. Also, when the initial configuration was not set by the occupant, emotion estimation processing by the occupant's facial expression may become impossible to perform or estimation accuracy may fall. Furthermore, sometimes the occupant's facial expression becomes unnatural by causing the occupant to consciously make a neutral facial expression, which may result in an estimation accuracy fall.

Therefore, automatic acquiring of the occupant's face image with neutral facial expression is conceivable. For example, the occupant's image is acquired by capturing images of the occupant when the occupant gets on the vehicle 100 or during travel of the vehicle 100. However, for example, if image-capturing is performed under special situations, such as while travelling on a curve or a highway or while parking, face image of the occupant not in one's plain facial expression may be acquired. For example, the facial expression looking carefully into a mirror for parking the vehicle is similar to the facial expression when feeling "anger".

The information processing apparatus 200 according to the present embodiment monitors the situation of the vehicle 100 and stores the occupant's face image captured by the camera 110 when the occupant is likely to show a plain facial expression, as the occupant's face image with neutral facial expression. This may reduce the possibility of acquiring an occupant's face image not in a plain facial expression as the face image with neutral facial expression. For example, storing the occupant's face image as the occupant's face image with neutral facial expression may be storing the occupant's face image in association with information that the face image is a neutral facial expression. Also, for example, storing the occupant's face image as the occupant's face image with neutral facial expression may be storing the occupant's face image in a storage region for storing occupant's face image with neutral facial expression.

The information processing apparatus 200 may share the occupant's face image, stored as the face image with neutral facial expression, with another vehicle 100, etc. For example, the information processing apparatus 200, having acquired the identification information of the occupant onboard the vehicle 100, stores the identification information of the occupant in association with the occupant's face image when storing the occupant's face image. Moreover, the information processing apparatus 200 transmits the occupant's face image associated with the identification information to an information management server 300 via a network 10.

For example, the identification information of the occupant is a user ID allocated by the information management server 300. The identification information capable of identifying the occupant may be, for example, any information such as the number of mobile phone owned by the occupant, etc., as long as the occupant is identifiable.

The network 10 may be any network. For example, the network 10 may include mobile communication systems such as a 3G (Third Generation) communication system, LTE (Long Term Evolution) communication system and 5G (Fifth Generation) communication system. The network 10 may include the Internet, a public wireless LAN (Local Area Network), any dedicated network, etc.

Face images collected from a plurality of information processing apparatuses 200 are registered in the information management server 300 for each piece of identification information. For example, when the information management server 300 receives a request including identification information, if a face image corresponding to the identification information is registered, the information management server 300 transmits the face image to the request transmission source. For example, the request transmission source is the information processing apparatus 200 of the vehicle 100. For example, the information processing apparatus 200 acquires the identification information of the occupant when the occupant gets on the vehicle 100 to which the information processing apparatus 200 is mounted, transmits the request including the identification information to the information management server 300 and receives face image from the information management server 300. The request transmission source may be any apparatus, as long as the apparatus performs emotion estimation processing based on the face image of a person.

Figure 2:
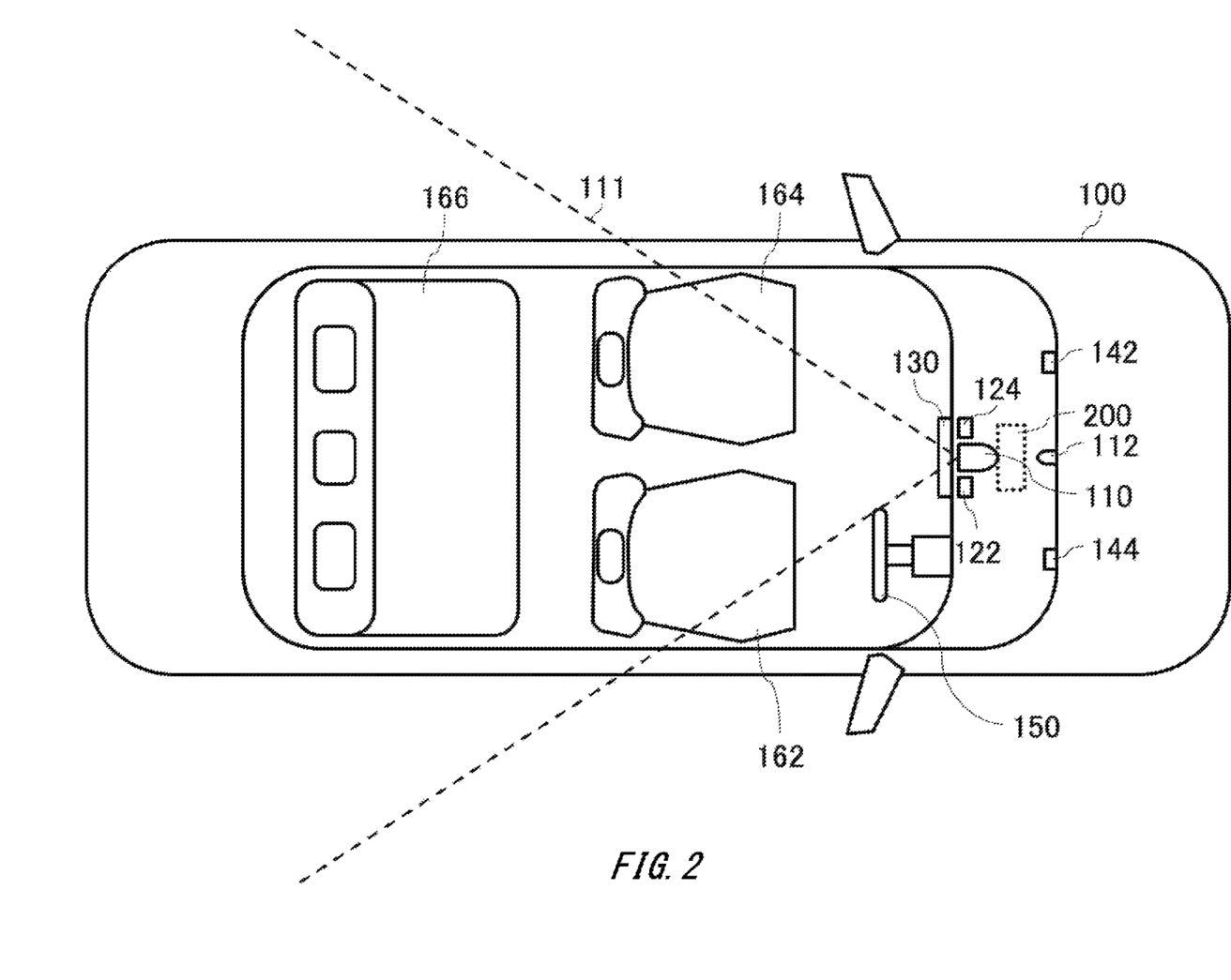
FIG. 2 schematically shows an example of a configuration of the vehicle 100.

FIG. 2 schematically shows an example of the configuration of the vehicle 100. The various configurations shown in FIG. 2 may be a part of a navigation system included in the vehicle 100.

The vehicle 100 includes a camera 110. FIG. 2 exemplifies a case for the vehicle 100 including the camera 110 which is capable of image-capturing all of the driver's seat 162, front passenger seat 164 and backseat 166. As seen from an angle of view 111 exemplified in FIG. 2, the camera 110 is capable of capturing images of the occupants on the driver's seat 162, front passenger seat 164 and backseat 166. The arrangement of the camera 110 in FIG. 2 is an example and the camera 110 may be arranged at any location provided that the camera 110 is capable of image-capturing all of the driver's seat 162, front passenger seat 164 and backseat 166. It should be noted that the vehicle 100 may include a plurality of cameras 110 for image-capturing each of the driver's seat 162, front passenger seat 164 and backseat 166.

The vehicle 100 may include a camera 112 for image-capturing ahead of the vehicle 100. The arrangement of the camera 112 in FIG. 2 is an example and the camera 112 may be arranged at any location provided that the camera 112 is capable of capturing images ahead of the vehicle 100. The camera 112 may be a so-called front view camera. Also, the camera 112 may be a so-called dashboard camera.

The vehicle 100 may include a microphone 122. FIG. 2 exemplifies a case of the vehicle 100 including the microphone 122 corresponding to all of the driver's seat 162, front passenger seat 164 and backseat 166. The arrangement of the microphone 122 in FIG. 2 is an example and the microphone 122 may be arranged at any location provided that the microphone 122 is capable of picking up the voices of all the occupants on the driver's seat 162, front passenger seat 164 and backseat 166. The vehicle 100 may include a plurality of microphones 122. For example, the plurality of microphones 122 includes a microphone 122 for the driver's seat 162, a microphone 122 for the front passenger seat 164 and a microphone 122 for the backseat 166.

The vehicle 100 includes a speaker 124. FIG. 2 exemplifies a case of the vehicle 100 including the speaker 124 corresponding to all of the driver's seat 162, front passenger seat 164 and backseat 166. The arrangement of the speaker 124 in FIG. 2 is an example and the speaker 124 may be arranged at any location. The vehicle 100 may include a plurality of speakers 124.

The vehicle 100 includes a display 130. The arrangement of the display 130 in FIG. 2 is an example and the display 130 may be arranged at any location if the display 130 is viewable mainly from the driver's seat 162 and front passenger seat 164. The display 130 may be a touch panel display. The vehicle 100 may include a plurality of displays 130. For example, the vehicle 100 includes the display 130 for the driver's seat 162 and front passenger seat 164 and the display 130 for the backseat 166.

The vehicle 100 includes a wireless communication antenna 142. The wireless communication antenna 142 may be an antenna for communicating with apparatuses on the network 10. For example, the vehicle 100 communicates with the apparatuses on the network 10 with the wireless communication antenna 142 via wireless base stations, wireless routers, etc., in a mobile communication system. It should be noted that the wireless communication antenna 142 may be an antenna for performing vehicle-to-vehicle communication, vehicle-to-infrastructure communication, etc. and the vehicle 100 may communicate with apparatuses on the network 10 via vehicle-to-vehicle communication, vehicle-to-infrastructure communication, etc.

The vehicle 100 includes a GPS (Global Positioning System) antenna 144. The GPS antenna 144 receives radio waves for position measurement from GPS satellites. The vehicle 100 may measure the position of the current location of the vehicle 100 using position measurement radio waves received by the GPS antenna 144. The vehicle 100 may measure the position of the current location of the vehicle 100 by further combining the position measurement by autonomous navigation. The vehicle 100 may measure the position of the current location of the vehicle 100 using any well-known position measurement technique.

The vehicle 100 may include an unillustrated sensor capable of detecting body information of the occupant on the vehicle 100. For example, the sensor is arranged on the steering wheel 150, driver's seat 162, front passenger seat 164, backseat 166, etc., to detect the body information such as heartbeat, pulse, sweating, blood pressure and body heat of the occupant. The vehicle 100 may include near-field communication unit for communications connection with wearable device worn by the occupant and may receive the body information of the occupant, detected by the wearable device, from the wearable device. For example, the near-field communication unit forms communications connection with the wearable device via Bluetooth (registered trademark), etc.

The above-mentioned various configurations may be included in the information processing apparatus 200. The information processing apparatus 200 may be integrated with or may also be separated from the navigation system included in the vehicle 100.

Figure 3:
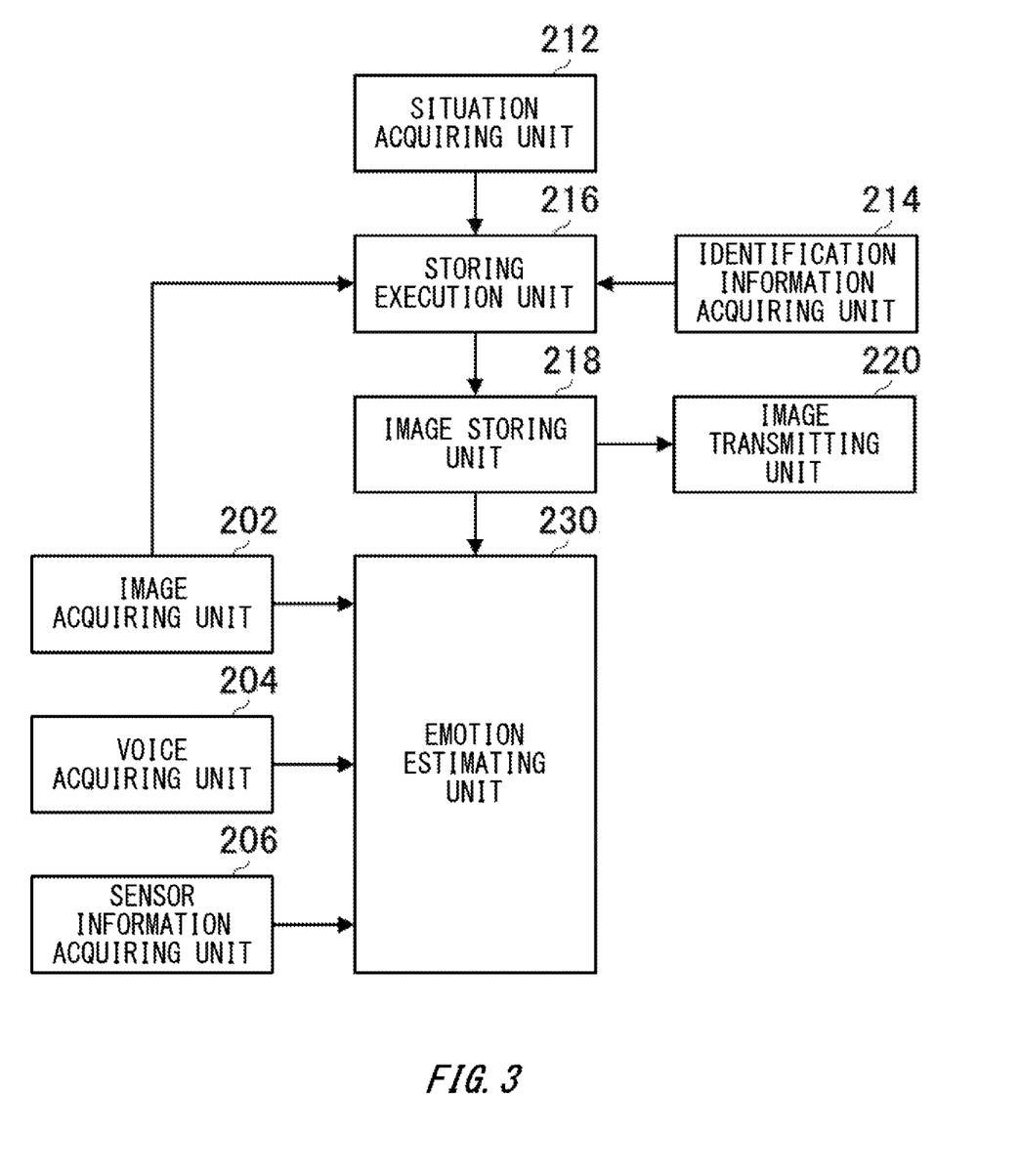
FIG. 3 schematically shows an example of a functional configuration of an information processing apparatus 200.

FIG. 3 schematically shows an example of the functional configuration of the information processing apparatus 200. The information processing apparatus 200 comprises an image acquiring unit 202, a voice acquiring unit 204, a sensor information acquiring unit 206, a situation acquiring unit 212, an identification information acquiring unit 214, a storing execution unit 216, an image storing unit 218, an image transmitting unit 220 and an emotion estimating unit 230. It should be noted that the information processing apparatus 200 does not necessarily include all these configurations.

The image acquiring unit 202 acquires an image of an occupant on the vehicle 100. The image acquiring unit 202 acquires the occupant's image captured by the image-capturing unit of the vehicle 100. The image acquiring unit 202 may continuously acquire the occupant's image captured by the image-capturing unit of the vehicle 100.

The voice acquiring unit 204 acquires the voice of the occupant on the vehicle 100. The voice acquiring unit 204 acquires the occupant's voice which is input from a microphone 122 in the vehicle 100. The voice acquiring unit 204 may continuously acquire the occupant's voice from the microphone 122 in the vehicle 100.

The sensor information acquiring unit 206 acquires the body information of the occupant on the vehicle 100 detected by the sensor. For example, the sensor information acquiring unit 206 acquires, from the sensor arranged in the steering wheel 150, driver's seat 162, front passenger seat 164, backseat 166, etc., body information such as heartbeat, pulse, sweating, blood pressure, body heat of the occupant detected by the sensor. Also, for example, the sensor information acquiring unit 206 acquires body information such as heartbeat, pulse, sweating, blood pressure, body heat of the occupant detected by the wearable device worn by the occupant from the wearable device.

The situation acquiring unit 212 acquires the situation of the vehicle. For example, the situation acquiring unit 212 acquires the situation of the vehicle 100 managed by the navigation system of the vehicle 100 from the navigation system. The navigation system of the vehicle 100 may judge the situation of the vehicle 100 from the location information of the vehicle 100, the map data and the road data in the vicinity of the travelling area of the vehicle 100, the speed, the rate of acceleration, the operating state of steering and operating state of brake of the vehicle 100, etc. The situation of the vehicle 100 may be judged by the situation acquiring unit 212. The situation acquiring unit 212 may judge the situation of the vehicle 100 using the information received from the navigation system of the vehicle 100.

For example, the situation of the vehicle 100 includes the information related to the driving speed of the vehicle 100. For example, the information related to the driving speed of the vehicle 100 includes travelling of the vehicle 100 at a normal speed, acceleration of the vehicle 100, quick acceleration or quick braking of the vehicle 100, quick stop of the vehicle 100, etc.

The situation of the vehicle 100 includes the situation ahead of the vehicle 100. The situation acquiring unit 212 may acquire the situation ahead of the vehicle 100 based on the image captured by the camera 112. The situation acquiring unit 212 may acquire the situation of the path through which the vehicle 100 moves. The situation acquiring unit 212 may acquire the situation of the road on which the vehicle 100 travels. For example, the situation acquiring unit 212 acquires the type of the road ahead of the vehicle 100. As a specific example, the situation acquiring unit 212 acquires the information that the road ahead of the vehicle 100 is a straight road, a curved road, a tunnel road, etc. Also, for example, the situation acquiring unit 212 acquires the information that the road ahead of the vehicle 100 is a flat road without undulations, an undulating road, etc.

Also, for example, the situation acquiring unit 212 acquires the information whether another vehicle is present ahead of the vehicle 100 or not. Also, for example, situation acquiring unit 212 acquires the information whether a traffic light exists ahead of the vehicle 100 or not. Also, for example, the situation acquiring unit 212 acquires the information whether an intersection exists ahead of the vehicle 100 or not. Also, for example, the situation acquiring unit 212 acquires the information whether a tunnel exists ahead of the vehicle 100 or not.

The situation acquiring unit 212 may acquire the situation ahead of the vehicle 100 from the map data and the road data in the vicinity of the travelling area of the vehicle 100. The situation acquiring unit 212 acquires, for example, the type of the road ahead of the vehicle 100. As a specific example, the situation acquiring unit 212 acquires the information that the road ahead of the vehicle 100 is a straight road, a curved road, a tunnel road, etc. Also, for example, the situation acquiring unit 212 acquires the information whether a traffic light exists ahead of the vehicle 100 or not. Also, for example, situation acquiring unit 212 acquires the information whether an intersection exists ahead of the vehicle 100 or not. Also, for example, situation acquiring unit 212 acquires the information whether a tunnel exists ahead of the vehicle 100 or not.

The situation acquiring unit 212 may acquire the situation ahead of the vehicle 100 based on the route, when a route to the destination of the vehicle 100 is set in a navigation system of the vehicle 100. For example, the situation acquiring unit 212 acquires the situation ahead of the vehicle 100 using the route and the map data and the road data in the vicinity of the vehicle 100.

Also, the situation acquiring unit 212 acquires, for example, an operation situation of the steering wheel 150 of the vehicle 100. The situation acquiring unit 212 may acquire the rotation angle of the steering wheel 150. The situation acquiring unit 212 may acquire whether the rotation angle of the steering wheel 150 falls within a predetermined range from a reference position. The predetermined range may be arbitrarily settable or may also be changeable.

The identification information acquiring unit 214 acquires the identification information of the occupant of the vehicle 100. The identification information acquiring unit 214 identifies, for example, a person by adopting person recognition technique to the occupant's face image acquired by the image acquiring unit 202 and acquires the identification information of the identified person. Also, the identification information acquiring unit 214 identifies, for example, a person by adopting speaker recognition technique to the occupant's voice acquired by the voice acquiring unit 204 and acquires the identification information of the identified person. The identification information acquiring unit 214 may receive the identification information of the occupant from a mobile communication terminal owned by the occupant, via near-field communication.

The storing execution unit 216 stores, in the image storing unit 218, the occupant's image captured by the camera 110 when the situation of the vehicle 100 acquired by the situation acquiring unit 212 is a predetermined situation, as the occupant's face image with neutral facial expression. For example, the storing execution unit 216 stores, in the image storing unit 218, the driver 52 image captured by the camera 110 when the situation of the vehicle 100 is in the predetermined situation, as the face image of the driver 52 with neutral facial expression. The storing execution unit 216 may store, in the image storing unit 218, the occupant's image captured by the camera 110 when the situation of the vehicle 100 acquired by the situation acquiring unit 212 matches any of the plurality of the predetermined situations, as the occupant's face image with neutral facial expression. The storing execution unit 216 may store the occupant's image in association with the identification information of the occupant in the image storing unit 218.

The predetermined situation may be a situation that is registered as a situation in which the occupant's facial expression is likely to have a plain facial expression when the vehicle 100 is in the situation. For example, the driver 52 is likely to have a plain facial expression while travelling along a straight road, and thereby, when the road ahead of the vehicle 100 is straight, the situation in which the road ahead of the vehicle 100 is a straight road may be registered. Also, for example, when the road ahead of the vehicle 100 is straight and other vehicles, traffic lights, intersections, tunnels, etc., do not exist, the driver 52 travelling the straight road is likely to have the plain facial expression and thereby such situation may be registered. Also, for example, when the steering wheel 150 of the vehicle 100 is not operated and the rotation angle of the steering wheel 150 falls within the a predetermined range from the reference position, the driver 52 is likely to have a plain facial expression and thereby such situation may be registered.

For example, when the road at a predetermined distance from the position of the vehicle 100 in the moving direction of the vehicle 100 is a straight road, the storing execution unit 216 stores, in the image storing unit 218, the occupant's face image captured by the camera 110 while the vehicle 100 travels along the straight road, as the occupant's face image with neutral facial expression. The predetermined distance may be arbitrarily settable or may also be changeable.

For example, when the road along which the vehicle 100 travels from the position of the vehicle 100 for a predetermined period is a straight road, the storing execution unit 216 stores, in the image storing unit 218, the occupant's face image captured by the camera 110 while the vehicle 100 travels along the straight road, as the occupant's face image with neutral facial expression. The predetermined period may be arbitrarily settable or may also be changeable. For example, the storing execution unit 216 may judge whether the road along which the vehicle 100 travels from the position of the vehicle 100 for a predetermined period is a straight road, based on the route of the vehicle 100 and the driving speed of the vehicle 100. The judge may be performed by the situation acquiring unit 212.

The storing execution unit 216 may store, in the image storing unit 218, the occupant's face image captured by the camera 110 when the operation situation of the steering wheel 150 of the vehicle 100 acquired by the situation acquiring unit 212 matches the predetermined situation, as the occupant's face image with neutral facial expression. The storing execution unit 216 stores, for example, in the image storing unit 218, the face image of the driver 52, captured by the camera 110 when the rotation angle of the steering wheel 150 of the vehicle 100 falls in the predetermined range from the reference position, as the face image of the driver 52 with neutral facial expression. In this manner, the face image of the driver 52 captured at a timing when the driver 52 is not rotating the steering wheel 150 and likely to have a plain facial expression can be stored, as the face image of the driver 52 with neutral facial expression.

The image transmitting unit 220 transmits, to the information management server 300, the occupant's face image stored in the image storing unit 218 in association with identification information. The image transmitting unit 220 may transmit the face image to the information management server 300 via the network 10. In this manner, the occupant's face image with neutral facial expression can be shared among a plurality of vehicles 100 to contribute to improvement of the emotion estimation accuracy for the whole of the plurality of vehicles 100.

The emotion estimating unit 230 estimates the emotion of the occupant by performing the emotion estimation processing. The emotion estimating unit 230 may perform emotion estimation processing using the occupant's face image acquired by the image acquiring unit 202. The emotion estimating unit 230 may estimate the emotion of the occupant by comparing the occupant's face image acquired by the image acquiring unit 202 and the occupant's face image with neutral facial expression stored in the image storing unit 218. Also, the emotion estimating unit 230 may estimate the emotion of the occupant by appropriately combining the voice information from the voice acquiring unit 204 and the sensor information acquired by the sensor information acquiring unit 206, with the occupant's face image acquired by the image acquiring unit 202.

The face of the occupant onboard the vehicle 100 may change in accordance with the state of the occupant, such as physical condition, length of hair, hairstyle, wearing glasses or not, and being sunburnt or not, and thereby it is preferable to use the most recent occupant's face image with neutral facial expression when performing emotion estimation processing. The information processing apparatus 200 according to the present embodiment can use a face image that is the most recent possible and in which the occupant is likely to have a plain facial expression, thereby contributing to improvement of the estimation accuracy in emotion estimation processing.

Figure 4:
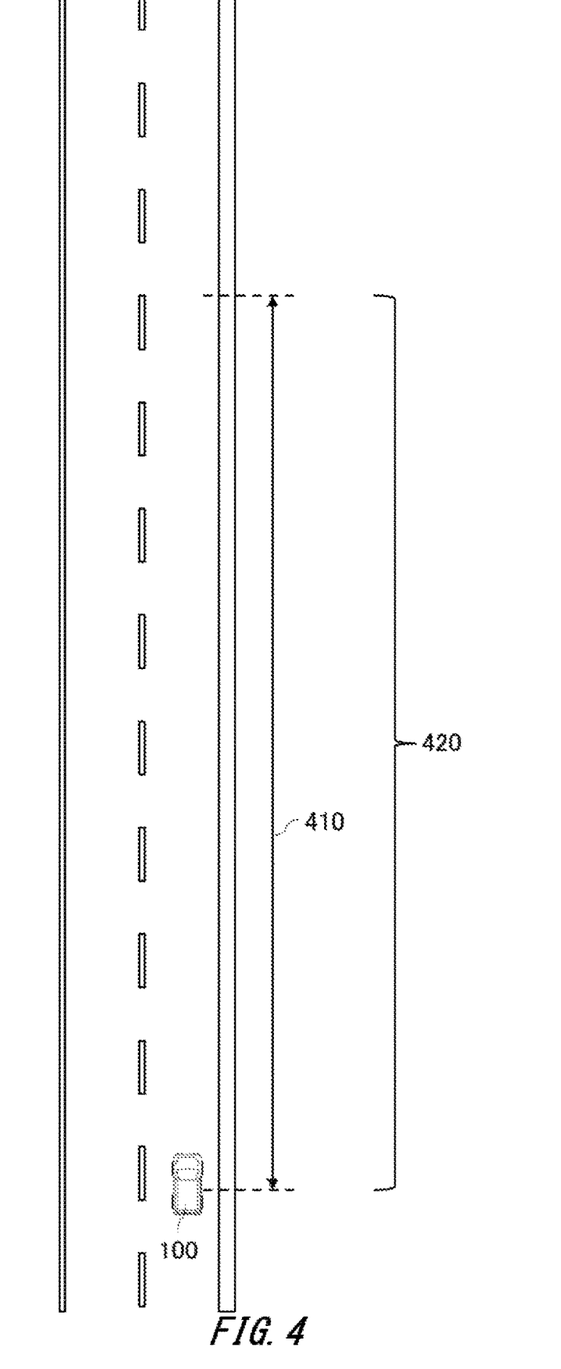
FIG. 4 schematically shows an example of an image acquiring area 420.

FIG. 4 schematically shows an example of the image acquiring area 420. The image acquiring area 420 may be an example of an area in which the information processing apparatus 200 stores the occupant's face image captured by the camera 110 as the occupant's face image with neutral facial expression.

When the road at a predetermined distance 410 from the position of the vehicle 100 in the moving direction of vehicle 100 is a straight road, the storing execution unit 216 may judge the straight road as the image acquiring area 420. The storing execution unit 216 stores, in image storing unit 218, the occupant's face image captured by the camera 110 while the vehicle 100 travels in an image acquiring area 420, as the occupant's face image with neutral facial expression.

Even when the road at the predetermined distance 410 from the position of the vehicle 100 in the moving direction of the vehicle 100 is a straight road, if there is another vehicle on the straight road, that is, in the range of the distance 410 as shown in FIG. 4, the storing execution unit 216 does not judge the straight road as the image acquiring area 420. That is, the storing execution unit 216 stores, in the image storing unit 218, the occupant's face image captured by the camera 110 while the vehicle 100 travels along the straight road, as the occupant's face image with neutral facial expression, under the condition that another vehicle is not present on the straight road. For example, the emotion of the occupant may change by shortening the distance between the vehicle 100 and another vehicle due to fall in the driving speed of the another vehicle or by a quick stop by the another vehicle. The storing execution unit 216 according to the present embodiment may reduce the possibility of acquiring the occupant's face image not having a plain facial expression as the face image with neutral facial expression, since acquiring the face image with neutral facial expression may be avoided when another vehicle is present.

Even when the road at the predetermined distance 410 from the position of the vehicle 100 in the moving direction of the vehicle 100 is a straight road, if there is a traffic light on the straight road, that is, in the range of the distance 410 as shown in FIG. 4, the storing execution unit 216 does not judge the straight road as the image acquiring area 420. That is, the storing execution unit 216 stores, in the image storing unit 218, the occupant's face image captured by the camera 110 while the vehicle 100 travels along the straight road, as the occupant's face image with neutral facial expression, under the condition that a traffic light does not exist on the straight road. For example, when the traffic light turns yellow, the emotion of the occupant may change by the occupant feeling impatience, etc. The storing execution unit 216 according to the present embodiment may reduce the possibility of acquiring the occupant's face image not having a plain facial expression as the face image with neutral facial expression, since acquiring the face image with neutral facial expression may be avoided when a traffic light exists.

Even when the road at the predetermined distance 410 from the position of the vehicle 100 in the moving direction of the vehicle 100 is a straight road, if there is an intersection on the straight road, that is, in the range of the distance 410 as shown in FIG. 4, the storing execution unit 216 does not judge the straight road as the image acquiring area 420. That is, the storing execution unit 216 stores, in the image storing unit 218, the occupant's face image captured by the camera 110 while the vehicle 100 travels along the straight road, as the occupant's face image with neutral facial expression, under the condition that an intersection does not exist on the straight road. For example, the emotion of the occupant may change when the vehicle 100 comes close to an intersection and the tension of the occupant of the vehicle 100 increases. The storing execution unit 216 according to the present embodiment may reduce the possibility of acquiring the occupant's face image not having a plain facial expression as the face image with neutral facial expression, since acquiring the face image with neutral facial expression may be avoided when an intersection exists.

Figure 5:
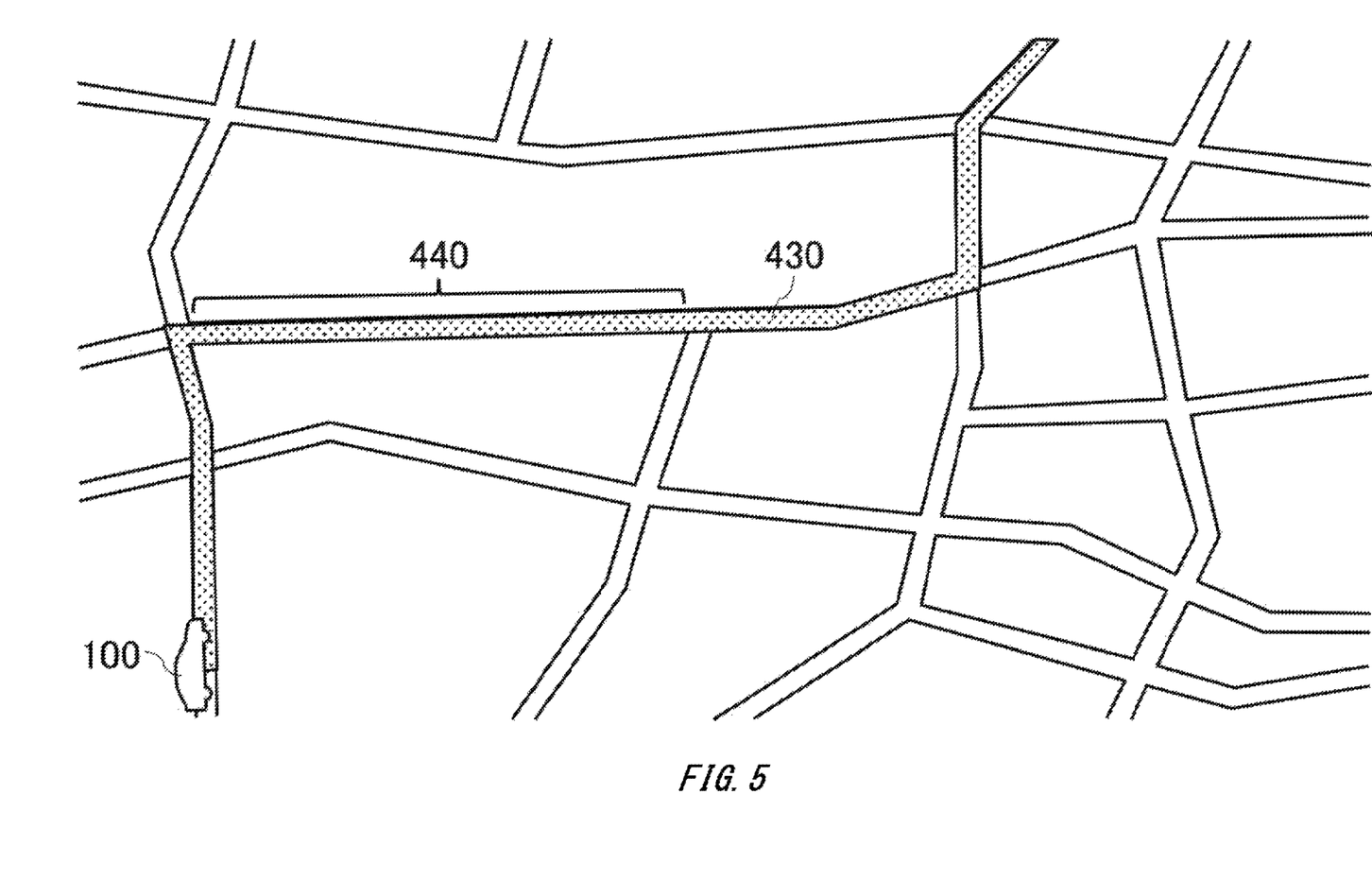
FIG. 5 schematically shows an example of an image acquiring area 440.

FIG. 5 schematically shows an example of the image acquiring area 440. The image acquiring area 440 may be an example of the area where the information processing apparatus 200 stores the occupant's face image captured by the camera 110, as the occupant's face image with neutral facial expression.

For example, the storing execution unit 216 may predetermine the image acquiring area 440, when the route 430 of the vehicle 100 to the destination is set in the navigation system. The storing execution unit 216, for example, specifies a straight road located most near to the vehicle 100 in the route 430 and sets the specified straight road as the image acquiring area 440. The storing execution unit 216 may specify a straight road without traffic lights, intersections and tunnels and located most near to the vehicle 100 in the route 430 and set the specified straight road as the image acquiring area 440.

The storing execution unit 216 may store, in the image storing unit 218, the occupant's face image with neutral facial expression, captured by the camera 110 while the vehicle 100 travels along the image acquiring area 440, as the occupant's face image with neutral facial expression.

In this manner, by determining the image acquiring area 440 in a range nearer to the vehicle 100, the occupant's face image with neutral facial expression can be acquired quicker to allow quicker use of the occupant's face image with neutral facial expression for emotion estimation of the occupant.

Figure 6:
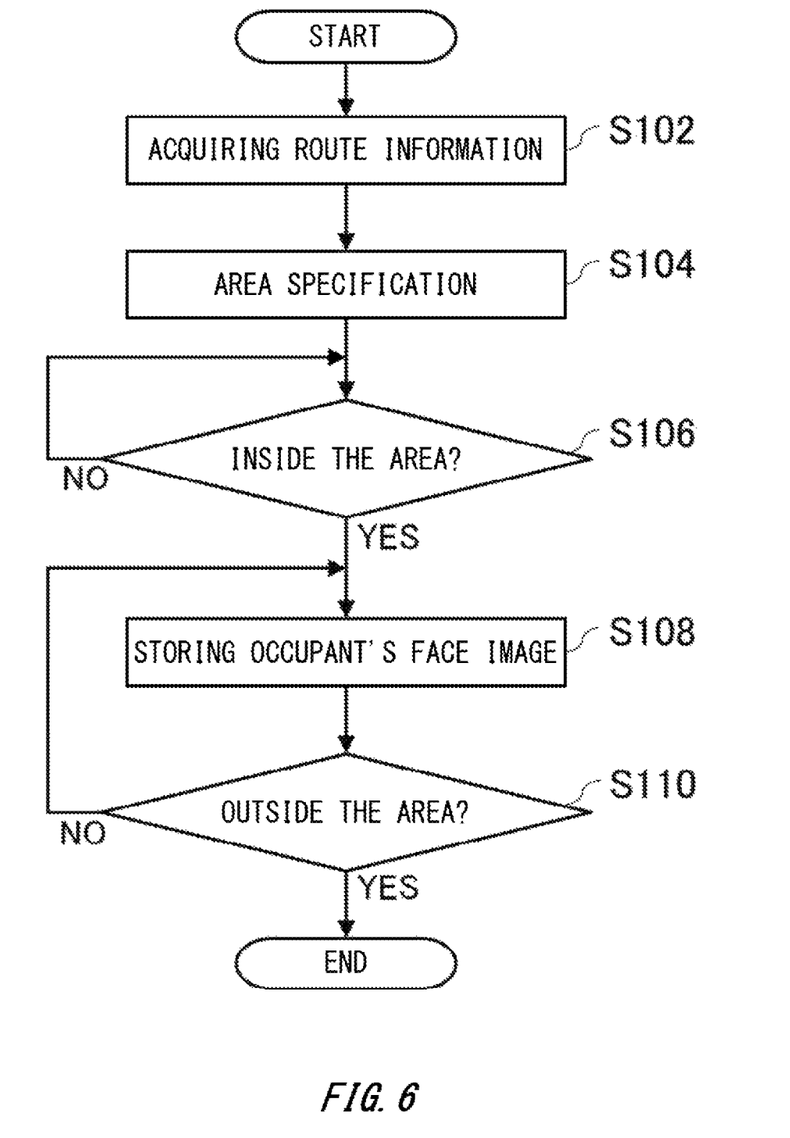
FIG. 6 schematically shows an example of a process flow of the information processing apparatus 200.

FIG. 6 schematically shows an example of a process flow of the information processing apparatus 200. FIG. 6 shows the process flow in which the storing execution unit 216 pre-specifies the image acquiring area and stores the occupant's face image captured within the image acquiring area.

In step 102 (step may be denoted as S for short), the storing execution unit 216 acquires the route information showing the route of the vehicle 100. In S 104, the storing execution unit 216 specifies the image acquiring area from the route shown in the route information.

In S 106, the storing execution unit 216 judges whether the vehicle 100 is located in the image acquiring area specified in S 104. The processing proceeds to S 108 when the vehicle 100 is judged to be located in the image acquiring area. In S 108, the storing execution unit 216 stores, in the image storing unit 218, the occupant's face image captured by the camera 110, as the occupant's face image with neutral facial expression.

In S 110, the storing execution unit 216 judges whether the vehicle 100 is located outside the image acquiring area. When the vehicle 100 is judged to be located outside the image acquiring area, the processing ends.

When the vehicle 100 is judged not to be located outside the image acquiring area, the processing returns to S 108 to store, in the image storing unit 218, the occupant's face image captured by the camera 110, as the occupant's face image with neutral facial expression. In this manner, the storing execution unit 216 may store the occupant's face image a plurality of times in the image storing unit 218 while the vehicle 100 travels within the image acquiring area. It should be noted that the number of times to store the occupant's face image in the image storing unit 218, while located in the image acquiring area, may be only once or may also be predetermined number of times.

Figure 7:
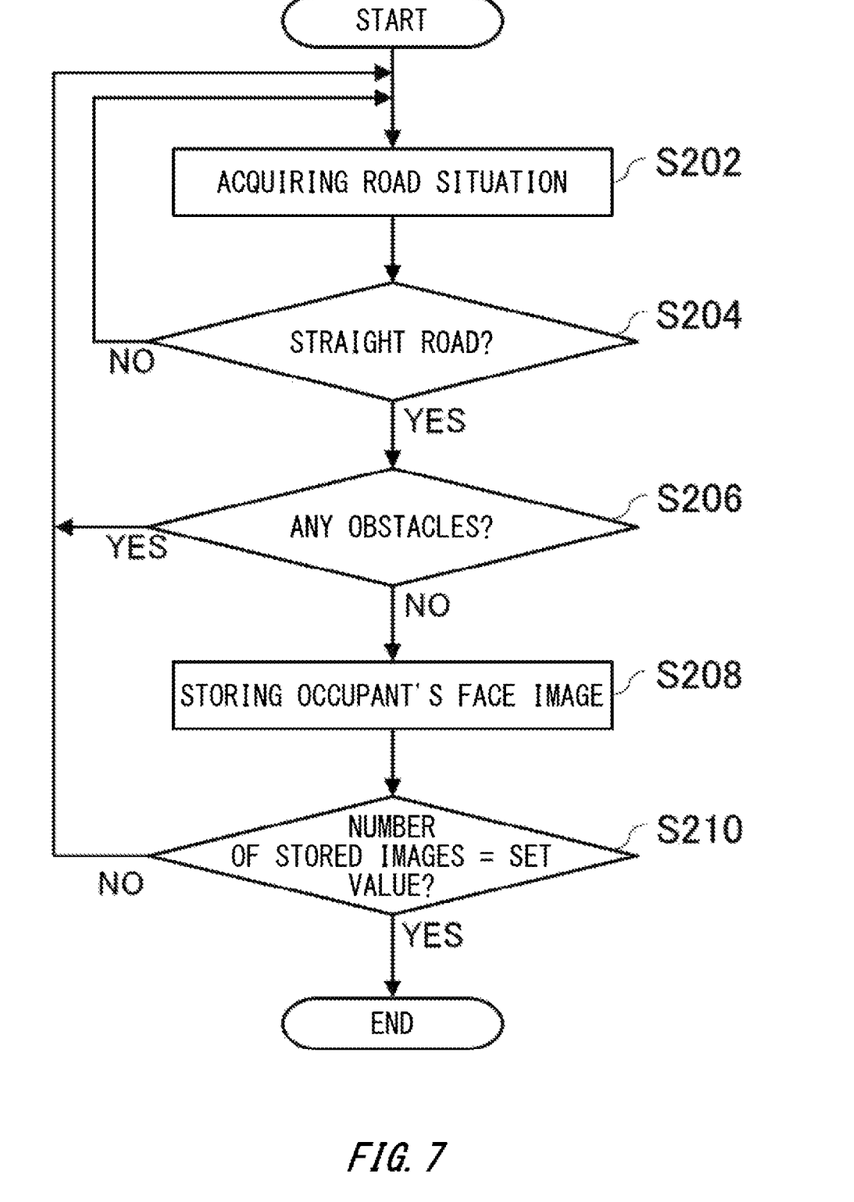
FIG. 7 schematically shows an example of a process flow of the information processing apparatus 200.

FIG. 7 schematically shows an example of a process flow of the information processing apparatus 200. FIG. 7 describes the process flow of the information processing apparatus 200 storing the occupant's face image in accordance with the situation while monitoring the situation of the vehicle 100 during the travelling of the vehicle 100.

In S 202, the situation acquiring unit 212 acquires the situation of the road ahead of the vehicle 100. In S 204, the storing execution unit 216 judges whether the road ahead of the vehicle 100 is a straight road. The processing proceeds to S 206 when the road is judged to be a straight road and returns to S 202 when judged not to be a straight road.

In S 206, the storing execution unit 216 judges whether an obstacle predetermined as inhibiting acquisition of an image exists ahead of the vehicle 100. For example, the obstacle is another vehicle. For example, the obstacle is a traffic light. For example, the obstacle is an intersection. For example, the obstacle is a tunnel. The processing returns to S 202 when an obstacle is judged to be present and proceeds to S 208 when judged not to be present.

In S 208, the storing execution unit 216 stores, in the image storing unit 218, the occupant's face image captured by the camera 110, as the occupant's face image with neutral facial expression. In S 210, the storing execution unit 216 judges whether the number of the occupant's face images with neutral facial expression stored is equal to a preset number. The processing returns to S 202 when the numbers are judged to be unequal and ends when judged to be equal.

Figure 8:
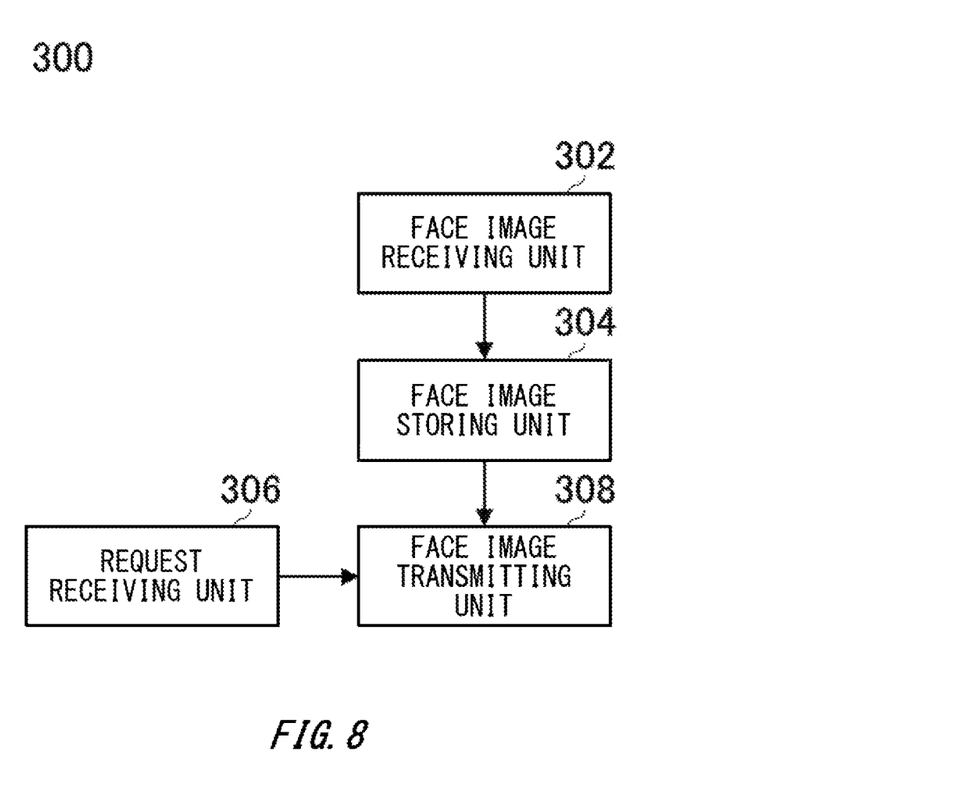
FIG. 8 schematically shows an example of a functional configuration of an information management server 300.

FIG. 8 schematically shows an example of functional configuration of the information management server 300. The information management server 300 includes a face image receiving unit 302, a face image storing unit 304, a request receiving unit 306 and a face image transmitting unit 308.

The face image receiving unit 302 receives face images associated with identification information from a plurality of information processing apparatuses 200 via the network 10. The face image storing unit 304 stores the face images received by the face image receiving unit 302.

The request receiving unit 306 receives a face image request including identification information. When the request receiving unit 306 receives the request, the face image transmitting unit 308 judges whether the face image associated with the identification information included in the request is stored in the face image storing unit 304 and, when the face image is stored, transmits the associated face image to the request transmission source.

Figure 9:
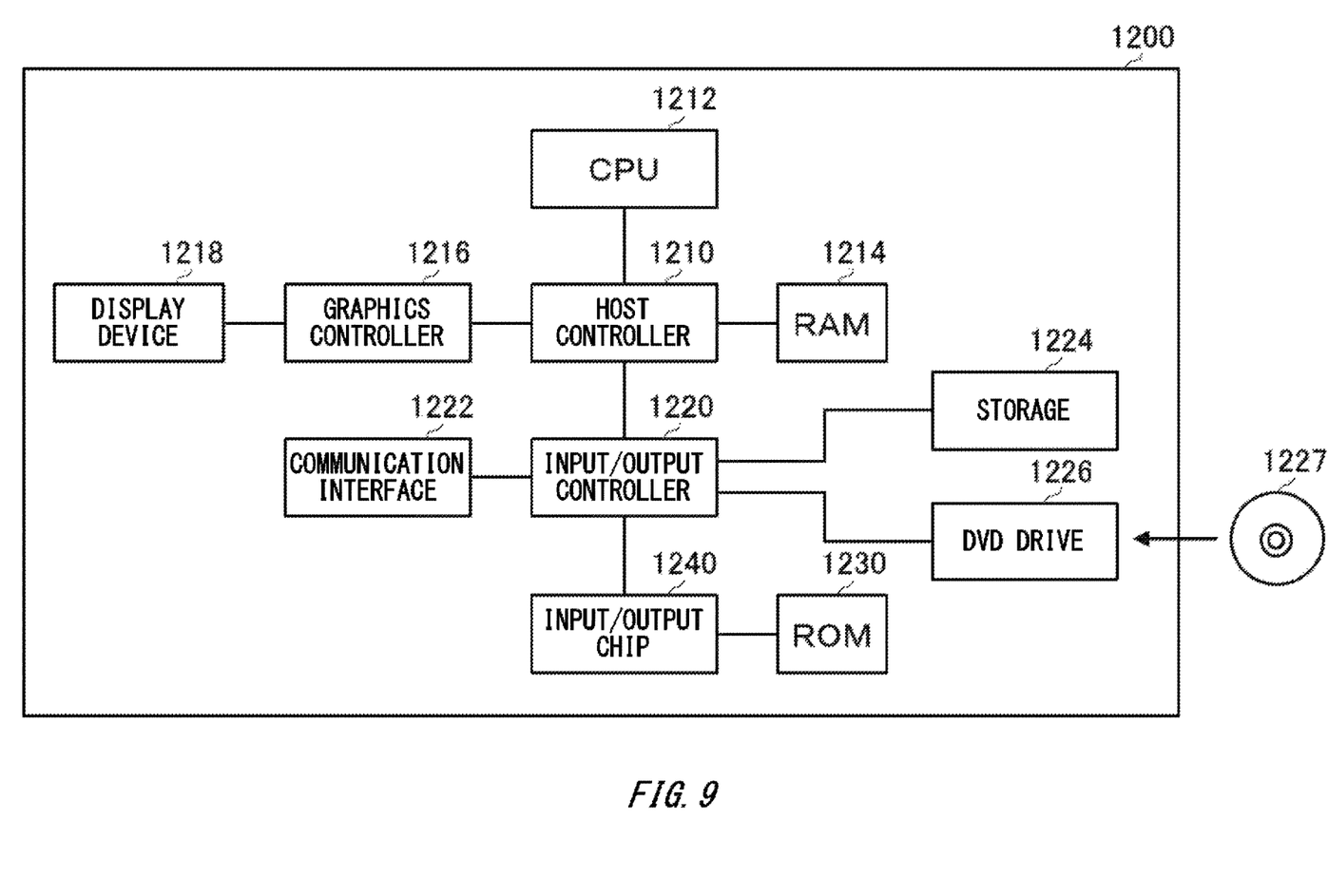
FIG. 9 schematically shows an example of a hardware configuration of a computer 1200 functioning as the information processing apparatus 200.

FIG. 9 schematically shows an example of the hardware configuration of the computer 1200 serving as the information processing apparatus 200. A program installed in the computer 1200 can cause the computer 1200 to serve as one or more of "section(s)" of the apparatus according to the above embodiment or cause the computer 1200 to execute an operation or one or more "section(s)" associated with the apparatus according to the above embodiment and/or cause the computer 1200 to execute the process or a step of the process according to the above embodiment. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, and a graphics controller 1216, which are mutually connected by a host controller 1210. The computer 1200 also includes input/output units such as a communication interface 1222, a storage 1224, a DVD drive 1226 and an IC card drive, which are connected to the host controller 1210 via an input/output controller 1220. The DVD drive 1226 may be DVD-ROM drive, DVD-RAM drive, etc. The storage 1224 may be a hard disk, a solid-state drive, etc. The computer 1200 also includes input/output units such as a ROM 1230 and a touch panel, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218. The computer 1200 does not necessarily include a display device 1218, in such case the graphics controller 1216 causes the image data to be displayed on external display device.

The communication interface 1222 communicates with other electronic devices via a wireless communication network. The storage 1224 stores programs and data used by the CPU 1212 within the computer 1200. The DVD drive 1226 reads the programs or the data from the DVD-ROM 1227, etc., and provides the storage 1224 with the programs or the data. The IC card drive reads programs and data from the IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port and the like to the input/output controller 1220.

A program is provided by computer readable storage media such as the DVD-ROM 1227 or the IC card. The program is read from the computer readable media, installed into the hard disk drive 1224, RAM 1214, or ROM 1230, which are also examples of computer readable media, and executed by the CPU 1212. The information processing described in these programs is read into the computer 2200, resulting in cooperation between a program and the above-mentioned various types of hardware resources. An apparatus or method may be constituted by realizing the operation or processing of information, according to the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage 1224, the DVD-ROM 1227, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage 1224, the DVD drive 1226 (DVD-ROM 1227), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 1212 may search, from the plurality of entries, for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable storage media on or near the computer 1200. In addition, a recording medium such as a hard disk or a RAM provided in a server system connected to a dedicated communication network or the Internet can be used as the computer readable media, thereby providing the program to the computer 2200 via the network.

The block in a flowchart and block diagram according to the above embodiment may indicate the "section" of a process stage in which an operation is performed or of an apparatus serving to perform an operation. Certain steps and "sections" may be implemented by dedicated circuit, programmable circuit supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits. Programmable circuit may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc., for example.

Computer-readable storage media may include any tangible device that can store instructions for execution by a suitable device, such that the computer-readable storage medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY™ disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., for the processor of the general purpose computer, special purpose computer, or other programmable data processing apparatus, or the programmable circuitry to execute the computer-readable instructions to create means for performing operations specified in the flowcharts or block diagrams. Examples of processors include computer processors, processing units, microprocessors, digital signal processors, controllers, microcontrollers, etc.

In the above embodiment, although the vehicle 100 has been described as an example of the movable object, it is not limited to this. For example, the movable object may be a train, an airplane, a ship, etc. In the above embodiments, the predetermined situation may be registered as a situation in which the occupant on the movable object is likely to have a plain facial expression when the movable object is in the situation, depending on the type of the movable objects.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: network; 52: driver; 54: passenger; 100: vehicle; 110: camera; 111: angle of view; 112: camera; 122: microphone; 124: speaker; 130: display; 142: wireless communication antenna; 144: GPS antenna; 150: steering wheel; 162: driver's seat; 164: front passenger seat; 166: backseat; 200: information processing apparatus; 202: image acquiring unit; 204: voice acquiring unit; 206: sensor information acquiring unit; 212: situation acquiring unit; 214: identification information acquiring unit; 216: storing execution unit; 218: image storing unit; 220: image transmitting unit; 230: emotion estimating unit; 300: information management server; 302: face image receiving unit; 304: face image storing unit; 306: request receiving unit; 308: face image transmitting unit; 410: distance; 420: image acquiring area; 430: route; 440: image acquiring area; 1200: computer; 1210: host controller; 1212: CPU; 1214: RAM; 1216: graphics controller; 1218: display device; 1220: input/output controller; 1222: communication interface; 1224: storage; 1226: DVD drive; 1227: DVD-ROM; 1230: ROM; 1240: input/output chip

What is claimed is:

1. An information processing apparatus comprising:
at least one processor;
a situation acquiring unit configured to acquire a situation of one movable object using the at least one processor; and
a storing execution unit configured to store a face image of an occupant of the one movable object captured by an image-capturing unit mounted on the one movable object in response to when the one movable object is in a predetermined situation, as a face image of the occupant with neutral facial expression using the at least one processor.

2. The information processing apparatus according to claim 1 comprising an emotion estimating unit configured to estimate emotion of the occupant of the one movable object, by comparing the face image of the occupant captured by the image-capturing unit and the face image of the occupant with neutral facial expression stored by the storing execution unit using the at least one processor.

3. The information processing apparatus according to claim 2, wherein the one movable object is an automobile,
the situation acquiring unit acquires an operation situation of a steering wheel of the one movable object, and
the storing execution unit stores the face image of the occupant, captured by the image-capturing unit while the operation situation of the steering wheel of the one movable object is a predetermined situation, as the face image of the occupant with neutral facial expression.

4. The information processing apparatus according to claim 3, wherein the storing execution unit stores the face image of the occupant captured by the image-capturing unit while a rotation angle of a steering wheel of the one movable object falls in a predetermined range from a reference position, as the face image of the occupant with neutral facial expression.

5. The information processing apparatus according to claim 1, wherein the situation acquiring unit acquires a situation of a path through which the one movable object moves, and
the storing execution unit stores the face image of the occupant captured by the image-capturing unit in response to when the situation of the path through which the one movable object moves is a predetermined situation, as a face image of the occupant with neutral facial expression.

6. The information processing apparatus according to claim 5, wherein the one movable object is an automobile and the situation acquiring unit acquires the situation of a road on which the one movable object travels.

7. The information processing apparatus according to claim 6, wherein the storing execution unit stores, in response to when the road at a predetermined distance from a position of the one movable object in the moving direction of the one movable object is a straight road, the face image of the occupant captured by the image-capturing unit while the one movable object travels along the straight road, as the face image of the occupant with neutral facial expression.

8. The information processing apparatus according to claim 7, wherein the storing execution unit stores the face image of the occupant captured by the image-capturing unit while the one movable object travels along the straight road, as the face image of the occupant with neutral facial expression, under a condition that another vehicle is not present on the straight road.

9. The information processing apparatus according to claim 7, wherein the storing execution unit stores the face image of the occupant captured by the image-capturing unit while the one movable object travels along the straight road, as the face image of the occupant with neutral facial expression, under a condition that a traffic light does not exist on the straight road.

10. The information processing apparatus according to claim 7, wherein the storing execution unit stores the face image of the occupant captured by the image-capturing unit while the one movable object travels along the straight road, as the face image of the occupant with neutral facial expression, under a condition that an intersection does not exist on the straight road.

11. The information processing apparatus according to claim 6, wherein the storing execution unit stores, in response to when the road along which the one movable object travels from a position of the one movable object for a predetermined period is a straight road, the face image of the occupant captured by the image-capturing unit while the one movable object travels along the straight road, as the face image of the occupant with neutral facial expression.

12. A non-transitory computer-readable storage medium having stored thereon a program for causing a computer to function as:
- a situation acquiring unit configured to acquire a situation of a one movable object; and
- a storing execution unit configured to store a face image of an occupant of the one movable object, captured by an image-capturing unit mounted on the one movable object in response to when the one movable object is in a predetermined situation, as a face image of the occupant with neutral facial expression.

* * * * *